United States Patent [19]

Hayashi

[11] Patent Number: 4,915,199

[45] Date of Patent: Apr. 10, 1990

[54] ROTARY MEMBER SUPPORTING APPARATUS

[75] Inventor: Yoshitaka Hayashi, Fujisawa, Japan

[73] Assignee: Nippon Seiko Kabushiki Kaisha, Tokyo, Japan

[21] Appl. No.: 265,567

[22] Filed: Nov. 1, 1988

[30] Foreign Application Priority Data

Nov. 6, 1987 [JP] Japan .................. 62-279373

[51] Int. Cl.⁴ .............................................. B60T 17/22
[52] U.S. Cl. ................................. 188/181 A; 384/448
[58] Field of Search .................. 188/181 A, 181 R; 310/168; 324/162; 384/448

[56] References Cited

U.S. PATENT DOCUMENTS

| | | | |
|---|---|---|---|
| 3,473,120 | 10/1969 | Ruof | 188/181 A X |
| 3,541,368 | 11/1970 | Jones et al. | 310/168 |
| 3,658,901 | 3/1972 | Burckhardt et al. | 188/181 A |
| 3,887,046 | 6/1975 | Bueler | 188/181 A |
| 4,795,278 | 1/1989 | Hayashi | 384/448 |

FOREIGN PATENT DOCUMENTS 3523374  1/1987  Fed. Rep. of Germany ... 188/181 R
63-87514  6/1988  Japan .

*Primary Examiner*—Duane A. Reger
*Attorney, Agent, or Firm*—Shapiro and Shapiro

[57] ABSTRACT

A sensor rotor unit mounted on a rotary member and cooperating with a sensor to detect the number of rotations of the rotary member includes at least a sensor rotor formed of a magnetic material and having a plurality of concavities and convexities provided at intervals in the circumferential direction thereof, and an annular rust preventing member made integral with the sensor rotor so as to surround the peripheral surface and end surface of the sensor rotor which are opposed to the rotary member.

18 Claims, 1 Drawing Sheet

ROTARY MEMBER SUPPORTING APPARATUS

BACKGROUND OF THE INVENTION

1. Field of the Invention

This invention relates to a sensor rotor unit and a bearing assembly, and in particular to a sensor rotor unit which cooperates with a sensor to detect the number of rotations of a rotary member made integral with a rotating wheel.

2. Related Background Art

In various industrial machines, it sometimes becomes necessary to use a bearing assembly including inner and outer races rotating relative to each other through rolling members in order to support a rotary member and moreover, to detect the number of rotations of the rotary member. For example, the anti-skid brake system in a vehicle has such requirements. This system detects the number of rotations of a wheel and momentarily releases the brake when the wheel is about to be locked, thereby preventing the locking of the wheel. For the detection of the number of rotations, use is suitably be made of a sensor rotor fixed to the rotating wheel and an electro-magnetic pick-up type sensor.

Heretofore, an annular member of a magnetic material having a concavo-convex gear portion formed on the outer peripheral surface thereof has been adopted as the sensor rotor, and it has been the practice to fit this annular member to the outer peripheral surface of the outer race. To form the gear portion, it is necessary to form an annular blank by a broaching process or machining by the use of a gear cutting machine, or by sintering. However, the broaching process or the like has resulted in a high working cost, and sintering has led to a problem in respect of strength as well as a problem that rust prevention is difficult.

So, to solve such problems, the applicant devised the invention described in Japanese Utility Model Application Laid-open No. 63-87514. In this application, a plate-like member is used as a blank forming a pulsar gear, and a window or a hole is formed therein by punching. If this is done, the abovenoted problems are eliminated, but a problem regarding rust prevention remains.

In practice, the bearing assembly is sometimes used under conditions in which it is exposed to rainwater. In order to prevent rust from being created due to rainwater, it is desirable to subject the sensor rotor to rust preventing treatment. However, even if the sensor rotor is subjected to the rust preventing treatment, if the rotating wheel of the bearing is not subjected to the rust preventing treatment, rust created on the bearing due to rainwater is propagated to the sensor rotor (extraneous rust). Thus, the sensor rotor may be rusted, whereby the wave form is disturbed and accurate detection is hampered.

It is not a simple matter to subject the rotating wheel of the bearing to the rust preventing treatment. The reason is that the rotating wheel is usually already subjected to heat treatment for hardening, and if it is thereafter subjected to the rust preventing treatment, the hardness thereof is reduced by high heat applied thereto at that time.

SUMMARY OF THE INVENTION

The present invention has been made with such circumstances as the background and an object thereof is to provide a rotary member supporting apparatus which is contrived and improved so that even if rust is created on a rotary member such as the rotating wheel of a bearing, it is not propagated to a sensor rotor.

Another object of the present invention is to provide a sensor rotor unit which is mounted on a rotary member and used to cooperate with a sensor to detect the number of rotations of the rotary member and which is contrived and improved so that even if, for example, rust is created on a rotary member, it is not propagated to a sensor rotor.

To achieve the above objects, in the present invention, the sensor rotor unit for detecting the number of rotations of the rotary member is comprised of an annular sensor rotor formed of a magnetic material and having a plurality of concavities and convexities provided at intervals in the circumferential direction thereof, and an annular rust preventing member formed of a rust preventing material and made integral with the sensor rotor so as to surround the surface portion (the peripheral surface and end surface) of the sensor rotor which is opposed to said rotary member.

Also, the rotary member supporting apparatus in which the rotary member is supported by a fixed member is constructed by mounting said sensor rotor unit on the rotary member.

Herein, the term "rust preventing property" refers to the property of preventing rust created on the rotating wheel from being propagated to the sensor rotor (the rust shielding property) and the property of not creating rust in itself (the non-rusting property).

DESCRIPTION OF THE PREFERRED EMBODIMENT

Figure 1:
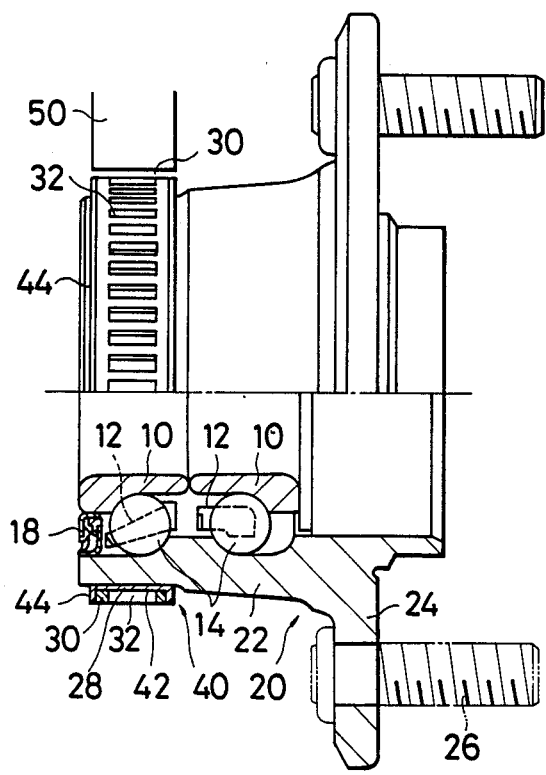
FIG. 1 is a front view (half in cross-section) showing an embodiment of the present invention.

An embodiment of the present invention will hereinafter be described with reference to the drawing. This embodiment is used in the anti-skid brake system of a vehicle, but of course, the present invention is not restricted thereto.

As shown in FIG. 1, the bearing assembly is a so-called angular contact type bearing including a pair of inner races 10 axially provided side by side, and an outer race 20 of unitary shape disposed outside and concentrically with the inner races 10 through two rows of balls 14 retained by a retainer 12. A seal 18 is interposed between the outer edge of one of the inner races 10 and the outer edge of the outer race 20 which is opposed thereto.

The outer race 20 has a body 22 and a flange portion 24 extending radially outwardly therefrom, and is fixed to a brake and a vehicle (not shown) by a bolt 26 extending through the flange portion.

A sensor rotor 30 is mounted on a mounting portion 28 of uniform diameter at one end of the outer race body 22 with a sleeve member 40 interposed therebetween. The sensor rotor 30 comprises a thin sheet of a magnetic material such as mild steel and presents an annular shape, and has a number of axially extending elongate rectangular punched windows (holes) 32 formed at intervals in the circumferential direction. On the other hand, the sleeve member 40 comprises a steel plate, such as of mild steel subjected to rust preventing treatment, and presents an annular shape. The sleeve member has a cylindrical body 42 and a pair of flange portions 44 bendingly formed radially outwardly at the opposite ends thereof.

The inner diameter of the sleeve member body 42 is equal to the outer diameter of the mounting portion 28 of the outer race body, and the inner diameter of the sensor rotor body is substantially equal to the outer diameter of the sleeve member body. Also, the width of the sensor rotor 30 is substantially equal to the width of the sleeve member body 42, i.e., the distance between the two flanges 44.

The sensor rotor 30 and the sleeve member 40 are made integral with each other by fitting the sensor rotor 30 to the sleeve member 40 and determining the relative position thereof in the axial direction, and thereafter bending the opposite side edges of the sleeve member 40 radially outwardly. The sensor rotor and the sleeve member thus made integral with each other are mounted on the mounting portion 28 of the outer race body 22. In this embodiment, the sensor rotor 30 and the sleeve member 40 are subjected to the rust preventing treatment when they have been made integral with each other.

The bearing assembly is set by fitting the inner races 10 to a fixed shaft (not shown). Also, when the number of rotations of the wheel is to be detected, a pick-up type sensor 50 is disposed in proximity to the sensor rotor 30, as indicated in FIG. 1.

When the wheel rotates in use, the outer race 20 and the sensor rotor 30 mounted thereon rotate together and thus, the recesses or concave portions (i.e., windows 32, of the sensor rotor 30) and the convex portions (i.e., the pillar portions between the windows alternately pass the front of the sensor 40. Accordingly, the magnetic line of force is periodically varied by the sensor rotor 30, and by examining the state of this variation, the number of rotations of the wheel is detected.

As previously described, it is technically problematic to subject the outer race body 22 to the rust preventing treatment, and if this treatment is nonetheless applied, the cost will increase. In practice of the present invention, however, although rust is sometimes created on the outer race body 22, this rust is not propagated to the sensor rotor 30. The reason is that the sensor rotor 30 is mounted on the outer race body 22 through the sleeve member 40 comprising a steel plate subjected to the rust preventing treatment to prevent the propagation of rust, or comprising a stainless steel plate having a rust preventing property in itself. Additionally, rust is not created on the sleeve member 40 itself, nor on the the sensor rotor 30, which is itself subjected to the rust preventing treatment. To summarize, it is not possible for rust created on the other members to propagate to the sensor rotor 30, or that rust to be created on the sensor rotor 30 itself.

Also, it will be appreciated that the windows forming the recesses are formed in a right rectangular shape, that the shape and size of the windows 32 are constant in the direction of thickness of the sensor rotor, and moreover, that the thickness of the portions 36 forming the convex portions is constant. Accordingly, the passage of the magnetic line of force is sightly varied by the recesses and the convex portions, and the detection of the number of rotations of the wheel becomes accurate. Also, because the sensor rotor 30 comprises a thin cylindrical member, it is easy to make and only requires a low cost. Further, the weight of the sensor rotor 30 is small and therefore, the rotation of the outer race 20 is not adversely affected. Further still, the amount of protrusion of the sensor rotor in the radially outward direction is small and thus, there is no risk of interference with the surrounding instruments.

Figure 2:
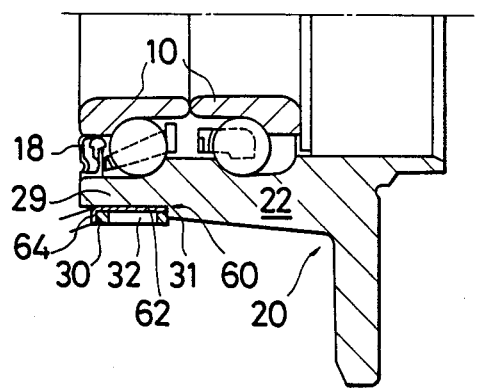
FIGS. 2 and 3 are cross-sectional views of portions of modifications of the FIG. 1 embodiment.

FIG. 2 shows a modification of the abovedescribed embodiment. In this modification, a mounting portion 29 and a stepped portion 31 are formed on the outer race body 22, and a sleeve member 60 comprises a body 62 and a flange portion 64 formed at one end thereof. The sensor rotor 30 is made integral with the sleeve member 60 and mounted on the mounting portion 29 of the outer race body 22, and is positioned by the flange portion 64 of the sleeve member 60 and the stepped portion 31.

Figure 3:
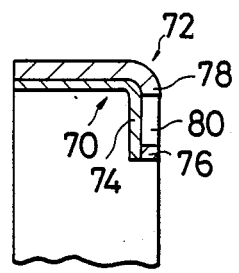

Also, according to a modification shown in FIG. 3, a sleeve member 70 and a sensor rotor 72 both have an L-shaped cross-section. The sleeve member 70 has a flange portion 76 at the end of a short piece portion 74 located on the end surface side of the outer race body 22, and the sensor rotor 72 has a hole 80 in a short piece portion 78. Thus, in this case, the sensor 50 is accessed sideways thereof.

The present invention is not restricted to the above-described embodiment, but in the rotatable inner race type, the sensor rotor and the sleeve member may also be mounted on the inner race.

As has hitherto been described, according to the present invention, even when the bearing assembly including the sensor rotor is used in a situation wherein it is exposed to rainwater, rust created on the rotating wheel is not propagated to the sensor rotor; nor is rust created on the sleeve member interposed between the sensor rotor and the rotating wheel. Therefore, the sensor rotor subjected to the rust preventing treatment is very rarely rusted by extraneous rust. Accordingly, by bringing the sensor close to the sensor rotor, the number of rotations of the rotating wheel can be detected accurately.

I claim:

1. A sensor rotor unit mounted on a rotary member which is susceptible to rust formation, and cooperating with a sensor to detect the number of rotations of said rotary member, said sensor rotor unit including:
   an annular sensor rotor formed of a magnetic material and having a plurality of concavities and convexities provided at intervals in the circumferential direction thereof; and
   an annular rust preventing member integrally connected with said sensor rotor and having a first peripheral surface fitted to and surrounding a peripheral surface of said sensor rotor and a second peripheral surface fitted to said rotary member such that said rust preventing member is interposed between said sensor rotor and said rotary member and thereby prevents rust formed on said rotary member from propagating to said sensor rotor.

2. A sensor rotor unit according to claim 1, wherein at least said rust preventing member comprises a stainless steel plate.

3. A sensor rotor unit according to claim 1, wherein said sensor rotor and said rust preventing member each comprise a mild steel plate subjected to rust preventing treatment.

4. A sensor rotor unit according to claim 1, wherein the concavities and convexities of said sensor rotor are constituted respectively by hole portions and pillar-like portions formed at predetermined circumferential intervals in said sensor rotor.

5. A sensor rotor unit according to claim 4, wherein said hole portions are of an axially elongate rectangular shape.

6. A sensor rotor unit according to claim 1, wherein said rust preventing member has an axial length greater than the axial length of said sensor rotor, said first peripheral surface of said rust preventing member is fitted to and surrounds said sensor rotor from an inner peripheral surface side thereof, and said rust preventing member has opposite end portions bent substantially at right angles so as to embrace opposite axial ends of said sensor rotor.

7. A rotary member supporting apparatus including:
a fixed member;
an annular rotary member rotatably supported on said fixed member and susceptible to rust formation; and
a sensor rotor unit comprising an annular sensor rotor formed of a plate-like magnetic material and having a plurality of concavities and convexities provided at intervals in the circumferential direction thereof, and an annular rust preventing member integrally connected with said sensor rotor and having a peripheral surface fitted to and surrounding a peripheral surface of said sensor rotor and a second peripheral surface fitted to a peripheral surface of said rotary member such that said sensor rotor unit is mounted on said rotary member through said rust preventing member, which thereby prevents rust formed on said rotary member from propagating to said sensor rotor;
whereby the number of rotations of said rotary member may be detected by a sensor brought close to the concavities and convexities of said sensor rotor.

8. A rotary member supporting apparatus according to claim 7, wherein said rust preventing member has an axial length greater than the axial length of said sensor rotor, said first peripheral surface of said rust preventing member is fitted to and surrounds said sensor rotor from an inner peripheral surface side thereof, and said rust preventing member has opposite end portions bent substantially at right angles so as to embrace opposite ends of said sensor rotor.

9. A rotary member supporting apparatus according to claim 8, wherein at least said rust preventing member comprises a stainless steel plate.

10. A rotary member supporting apparatus according to claim 8, wherein said sensor rotor and said rust preventing member each comprise a mild steel plate subjected to rust preventing treatment.

11. A rotary member supporting apparatus according to claim 8, wherein the concavities and convexities of said sensor rotor are constituted respectively by hole portions and pillar-like portions formed at predetermined circumferential intervals in said sensor rotor.

12. A rotary member supporting apparatus according to claim 11, wherein said hole portions are of an axially elongate rectangular shape.

13. A bearing assembly including:
inner and outer races, at least one of which is rotatable and susceptible to rust formation; and
a sensor rotor unit comprising an annular sensor rotor formed of a plate-like magnetic material and having a plurality of concavities and convexities provided at intervals in the circumferential direction thereof, and an annular rust preventing member integrally connected with said sensor rotor and having a peripheral surface fitted to and surrounding a peripheral surface of said sensor rotor, said sensor rotor unit being mounted to said rotatable race through said rust preventing member such that said rust preventing member is interposed between said sensor rotor and said rotatable race and thereby prevents rust formed on said rotatable race from propagating to said sensor rotor;
whereby the number of rotations of said rotatable race may be detected by a sensor brought close to the concavities and convexities of said sensor rotor.

14. A bearing assembly according to claim 13, wherein said inner race is fixed and said outer race is rotatably supported on the fixed inner race, said rust preventing member has an axial length greater than the axial length of said sensor rotor, said first peripheral surface of said rust preventing member surrounds said sensor rotor from an inner peripheral surface side thereof, said rust preventing member has opposite end portions bent substantially at right angles so as to embrace opposite axial ends of said sensor rotor, and said rust preventing member is fitted directly to an outer peripheral surface of said outer race.

15. A bearing assembly according to claim 14, wherein at least said rust preventing member comprises a stainless steel plate.

16. A bearing assembly according to claim 14, wherein said sensor rotor and said rust preventing member each comprise a mild steel plate subjected to rust preventing treatment.

17. A bearing assembly according to claim 14, wherein the concavities and convexities of said sensor rotor are constituted respectively by hole portions and pillar-like portions formed by at predetermined circumferential intervals in said sensor rotor.

18. A bearing assembly according to claim 17, wherein said hole portions are of an axially elongate rectangular shape.

* * * * *